(12) United States Patent
Haller et al.

(10) Patent No.: US 7,551,593 B2
(45) Date of Patent: *Jun. 23, 2009

(54) DEVICE, SYSTEM, METHOD AND COMPUTER READABLE MEDIUM FOR PAIRING OF DEVICES IN A SHORT DISTANCE WIRELESS NETWORK

(75) Inventors: Amit Haller, Belmont, CA (US); Peter Fornell, Lake Oswego, OR (US); Avraham Itzchak, Ra'anana (IL); Ziv Haparnas, Tel Aviv (IL); Amir Glick, Tel Aviv (IL)

(73) Assignee: IXI Mobile (R&D), Ltd. (IL)

( * ) Notice: Subject to any disclaimer, the term of this patent is extended or adjusted under 35 U.S.C. 154(b) by 586 days.

This patent is subject to a terminal disclaimer.

(21) Appl. No.: 11/036,589

(22) Filed: Jan. 14, 2005

(65) Prior Publication Data
US 2005/0232187 A1    Oct. 20, 2005

Related U.S. Application Data

(63) Continuation of application No. 09/990,424, filed on Nov. 21, 2001, now Pat. No. 6,845,097.

(51) Int. Cl.
*H04Q 7/24* (2006.01)
(52) U.S. Cl. .................. 370/338; 370/349; 445/41.2
(58) Field of Classification Search .................. None
See application file for complete search history.

(56) References Cited

U.S. PATENT DOCUMENTS

| | | | |
|---|---|---|---|
| 5,457,737 A | 10/1995 | Wen | |
| 6,766,160 B1 * | 7/2004 | Lemilainen et al. | 455/411 |
| 6,772,331 B1 * | 8/2004 | Hind et al. | 713/151 |
| 6,842,460 B1 * | 1/2005 | Olkkonen et al. | 370/465 |
| 7,002,942 B2 * | 2/2006 | Kotzin | 370/338 |
| 2003/0194090 A1 | 10/2003 | Tachikawa | |
| 2006/0046664 A1 | 3/2006 | Paradiso et al. | |
| 2006/0282518 A1 * | 12/2006 | Karaoguz et al. | 709/221 |

FOREIGN PATENT DOCUMENTS

| DE | EP 1146692 A | 10/2001 |
|---|---|---|
| WO | WO 99/01969 A | 1/1999 |
| WO | WO 00/51293 A | 8/2000 |

* cited by examiner

*Primary Examiner*—Duc C Ho
(74) *Attorney, Agent, or Firm*—Century IP Group, Inc.; F. Jason Far-hadian, Esq.

(57) ABSTRACT

A device, a system, a method and a computer readable medium allowing a user to efficiently and easily add/remove or pair a processing device to a short distance wireless network is provided according to embodiments of the present invention. A user enters a PIN into a device. The device is then automatically paired to another device without any further user intervention to form a short distance wireless network in an embodiment of the present invention. A third party such as a manufacturer, reseller or telecommunication provider enables a processing device to be added to the short distance wireless network by generating a pairing message over the Internet or a SMS in an embodiment of the present invention. A user is able to know when a PIN code is invalid by a device performing error detection in another embodiment of the present invention. In still another embodiment of the present invention, the device also stores an error correction software component for correcting an erroneously inputted PIN.

17 Claims, 9 Drawing Sheets

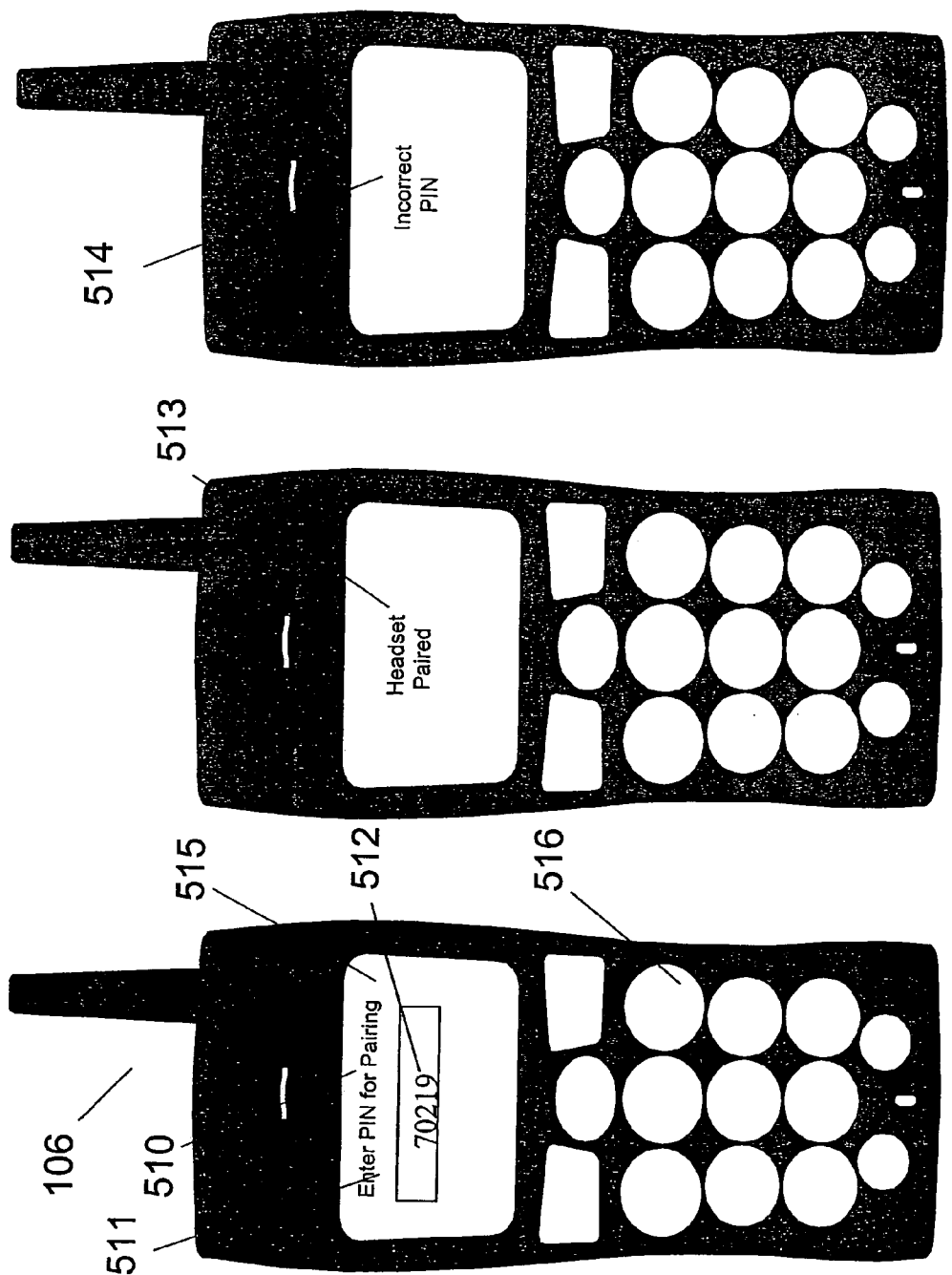

Welcome to IXI mobile's Pairing Page — 700

User Name

PIN

Device Identification Number

Device Manufacturer

Device Model

DEVICE, SYSTEM, METHOD AND COMPUTER READABLE MEDIUM FOR PAIRING OF DEVICES IN A SHORT DISTANCE WIRELESS NETWORK

This application is a continuation of U.S. patent application Ser. No. 09/990,424 filed on Nov. 21, 2001 now U.S. Pat. No. 6,845,097.

FIELD OF THE INVENTION

This invention relates generally to a network.

BACKGROUND OF THE INVENTION

Processing devices are often added to a network, such as a wide area network ("WAN"), local area network ("LAN") or a short distance wireless network.

A wireless communication device, such as a cellular telephone, is typically a node of a WAN or communication network. The cellular telephone may also be a part of a LAN or a short distance wireless network for communicating with other user devices, such as a laptop, printer, Personal Digital Assistant ("PDA") and/or headset. For example, Bluetooth™ technology (www.Bluetooth.com) provides wireless communications between devices.

Typically, a user manually adds or pairs a processing device to a Bluetooth™ short distance wireless network. There are several ways to add a processing device to a Bluetooth™ short distance wireless network. A user may select a "discover" mode, in for example a cellular telephone having Bluetooth™ capability, for finding other nearby Bluetooth™ devices. The cellular telephone then proceeds to find other possible Bluetooth™ device to be paired with the cellular telephone. Often, the discovered devices are then provided in the form of a list to the user who may then select the desired device, such as a laptop computer, to be paired with the cellular telephone. The user then may be prompted for a security code or Personal Identification Code ("PIN") or passkey on the cellular telephone display. A user then may enter the appropriate PIN. Likewise, the discovered device prompts the user for a PIN that may be entered. Bluetooth™ technology then establishes a communication channel between the processing devices.

Pairing or adding a processing device to a short distance wireless network, and in particular a Bluetooth™ short distance wireless network, has many disadvantages.

First, significant amount of user intervention and attention is required. A user has to "discover" and select which devices to be paired in the short distance wireless network. A user has to obtain and enter a PIN code at possibly two different devices.

Second, a third party such as a manufacturer, a reseller or a telecommunication provider does not typically control or enable the pairing. For example, a telecommunication provider may want to approve or authorize any proposed paring in a short distance wireless network. Likewise, a telecommunication provider may want to remove a paired device from the short distance wireless network.

Third, often a user does not know whether they entered an incorrect PIN code or if there is an error in a Bluetooth™ communication channel. A user may waste time trying to obtain a Bluetooth™ connection rather than reentering a correct PIN.

Therefore, it is desirable to provide a device, a system, a computer readable medium and a method that allow a user to efficiently and easily add a processing device to a short distance wireless network. It is further desirable 1) for a third party, such as a manufacturer, reseller or telecommunication provider to add/remove or authorize the adding of the processing device to the short distance wireless network and 2) for a user to know whether a PIN code has been entered properly.

SUMMARY OF THE INVENTION

A device, a system, a computer readable medium and a method allowing a user to efficiently and easily add/remove or pair a processing device to a short distance wireless network is provided according to embodiments of the present invention. A user enters a PIN into a device. The device is then automatically paired to another device without any further user intervention to form a short distance wireless network in an embodiment of the present invention. A third party such as a manufacturer, a reseller or a telecommunication provider adds a processing device to the short distance wireless network by providing a pairing message over the Internet, Wide Area Network or a Short Message Service ("SMS") in an alternate embodiment of the present invention. A user is able to know when a PIN code has been entered improperly by a device detecting an error in the PIN code and displaying a warning if the PIN code is invalid in another embodiment of the present invention. In still a further embodiment of the present invention, the device corrects an erroneously entered PIN.

According to an embodiment of the present invention, a system for forming a short distance wireless network is provided. The first device generates the short-range radio signal responsive to receiving a pairing message and an identification symbol. The second device generates a short-range radio signal containing the identification symbol and communicates with the first device responsive to the short-range radio signal.

According to an embodiment of the present invention, the pairing message is received from the Internet.

According to an embodiment of the present invention, the pairing message is received from an IP network.

According to an embodiment of the present invention, the pairing message is received from a short message service ("SMS").

According to an embodiment of the present invention, the pairing message includes an identification symbol, such as a Personal Identification Number ("PIN"), a device name, a device identification symbol, such as a Media Access Control ("MAC") address, a device manufacturer and a device model. According to an embodiment of the present invention, the paring message includes a pairing identification symbol and the first device compares the paring identification symbol to the identification symbol from the second device.

According to an embodiment of the present invention, the first device receives a remove or a confirm message for preventing or allowing communication between the first device and the second device.

According to still another embodiment of the present invention, the system further comprises a processing device in a wide area network for generating the pairing message responsive to a user input.

According to an embodiment of the present invention, the processing device is a telecommunication provider processing device, a seller processing device or a manufacturer processing device.

According to an embodiment of the present invention, user input is selected from a group consisting of a user identification symbol, a device name, a device manufacturer and a device model.

According to an embodiment of the present invention, the processing device is a computer and the user inputs an identification symbol into a web page in the wide area network.

According to an embodiment of the present invention, the processing device is a computer having an interactive voice recognition ("IVR") software component and the user utters an identification symbol into a telephone coupled to the computer.

According to an embodiment of the present invention, the processing device is a computer and the user enters an identification symbol into a telephone using Dual-Tone Multi-Frequency (DTMF) signals via the public telephone network coupled to the computer.

According to an embodiment of the present invention, the second device is selected from the group consisting of a desktop computer, a laptop computer, a personal digital assistant, a headset, a pager, a printer, a watch, a digital camera and an equivalent.

According to an embodiment of the present invention, the first device includes a short-range radio processor and a 2.4 GHZ transceiver.

According to an embodiment of the present invention, the first device includes a short-range radio processor and a 5.7 GHZ transceiver.

According to an embodiment of the present invention, the pairing message is encrypted.

According to an embodiment of the present invention, the paring message includes a digital signature for authentication.

According to an embodiment of the present invention, the first device verifies the identification symbol.

According to an embodiment of the present invention, a system for forming a short distance wireless network is provided. The system comprises a first device, having a display, which generates a short-range radio signal responsive to a user inputting an identification symbol. A user is notified of an invalid identification symbol responsive to detecting an error in the identification symbol. A second device communicates with the first device responsive to the short-range radio signal.

According to an embodiment of the present invention, the pairing message is generated in response to a user input at a telephone or a web site.

According to an embodiment of the present invention, the pairing message includes a personal identification symbol and the method further comprises the steps of verifying the personal identification symbol and notifying a user of the validity of the personal identification symbol.

According to an embodiment of the present invention, a method for adding a first device to a short distance wireless network having a second device is provided. A paring message is provided to the second device. An identification symbol is provided to the first device and a short-range radio signal is generated containing the identification symbol to the second device from the first device. A communication channel between the first device and the second device is formed responsive to the paring message and the identification symbol.

According to an embodiment of the present invention, an article manufacture, including a computer readable medium is provided. A short-range radio software component generates a short-range radio signal in a short distance wireless network. A pairing software component adds a device to the short distance wireless network in response to the pairing message.

Other aspects and advantages of the present invention can be seen upon review of the figures, the detailed description, and the claims that follow.

BRIEF DESCRIPTION OF THE FIGURES

FIGS. 5a-c illustrate user input/output in pairing devices in a short distance wireless network according to an embodiment of the present invention.

DETAILED DESCRIPTION

I. System Overview

The following description and claims relate to a device, a system, a method and a computer readable medium for pairing or adding a device to a short distance wireless network according to an embodiment of the present invention. Pairing refers to allowing a device to communicate with another device in a short distance wireless network.

In an embodiment of the present invention, a short distance wireless network is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, singly or in combination, or an equivalent. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks into a WAN. In an embodiment of the present invention, WAN 105 includes a cellular network generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 1:
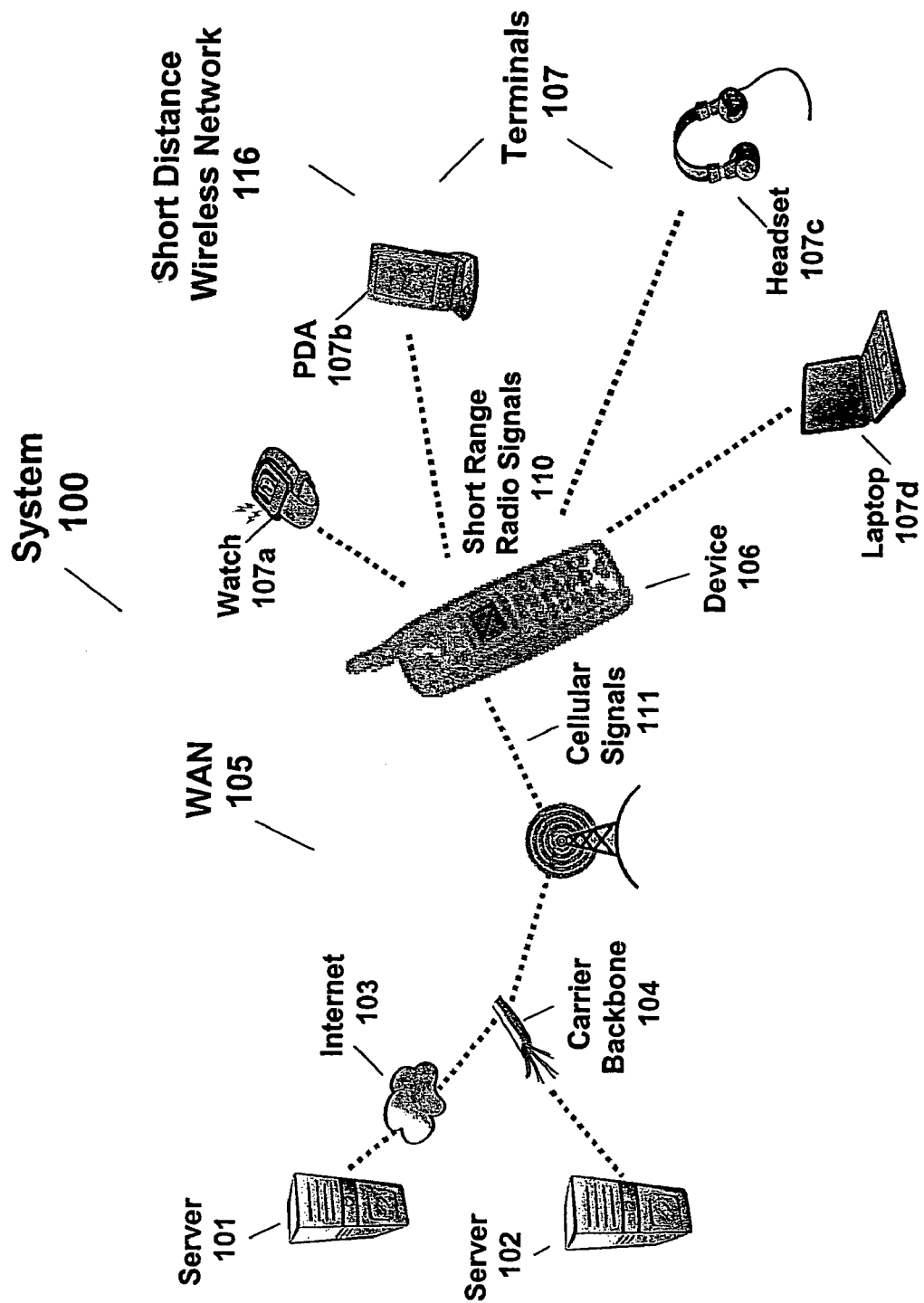
FIG. 1 illustrates a system according to an embodiment of the present invention.
Figure 3A:
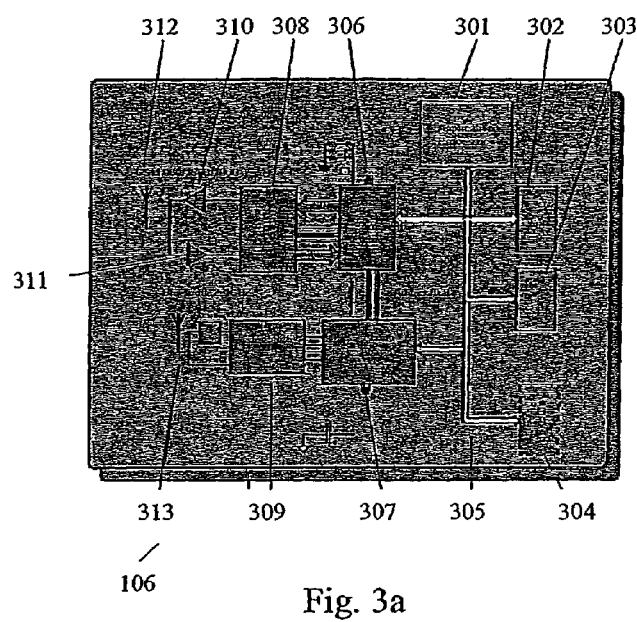
FIGS. 3a-b are hardware block diagrams of devices according to an embodiment of the present invention.
Figure 3B:
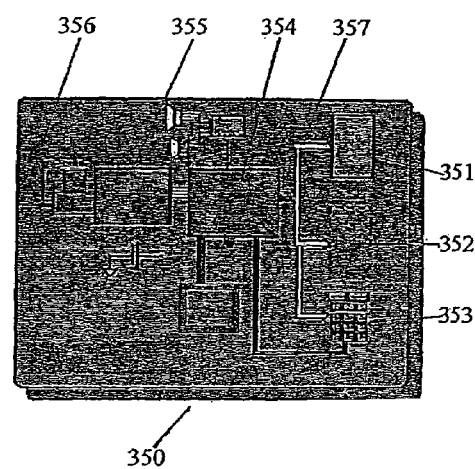

FIG. 1 illustrates system 100 according to an embodiment of the present invention. System 100 includes terminals 107 coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d. In an alternate embodiment, fewer or more terminals are used in short distance wireless network 116. In an alternate embodiment, terminals 107 include a desktop computer, a pager, a printer, a thin terminal, messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHZ transceiver is used. Hardware for device 106 and terminals 107 is illustrated in FIGS. 3a-b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), or General Packet Radio Service ("GPRS") protocol or an equivalent is used.

In an embodiment of the present invention, WAN 105 includes carrier backbone 104, server 101-102 and Internet 103. In an embodiment of the present invention, IP packets are transferred between the components illustrated in FIG. 1. In alternate embodiments of the present invention, other packet types are transferred between the components illustrated in FIG. 1.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as a web site having web pages or application software components, to terminals 107 by way of device 106. In an embodiment of the present invention, terminals 107 share services and communicate by way of device 106.

Figure 8:
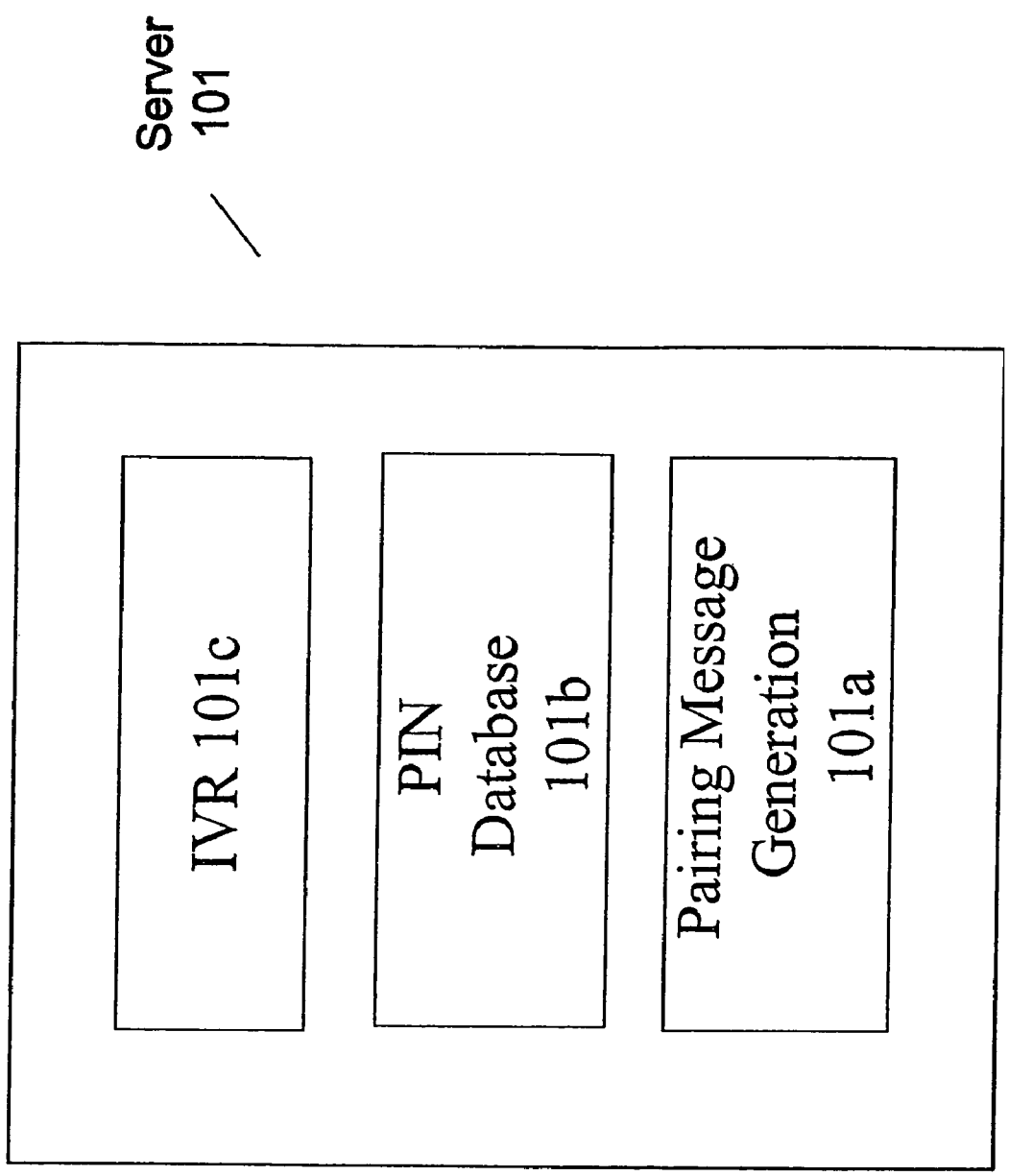
FIG. 8 illustrates a software block diagram architecture of server 101 according to an embodiment of the present invention.

In an embodiment of the present invention, server 101 includes pairing message generation software component 101a, PIN database 101b and interactive voice recognition ("IVR") software component 101c as illustrated by FIG. 8. Message generation software component 101a generates a pairing and/or remove pairing message to device 106 as described below in an embodiment of the present invention. IVR 101c is used to translate human utterances into computer readable information for message generation software component 101a. For example, a user may access server 101 by telephone in order to provide a PIN by voice or via DTMF. IVR 101c would then translate the PIN utterance or DTMF tones to a computer readable format for generating a pairing message. In an embodiment of the present invention, PIN database 101b is used to confirm or authorize a paring as described below.

Likewise, Server 102, coupled to carrier backbone 104, has similar software components and bypasses Internet 103 in an alternate embodiment of the present invention.

Figure 4:
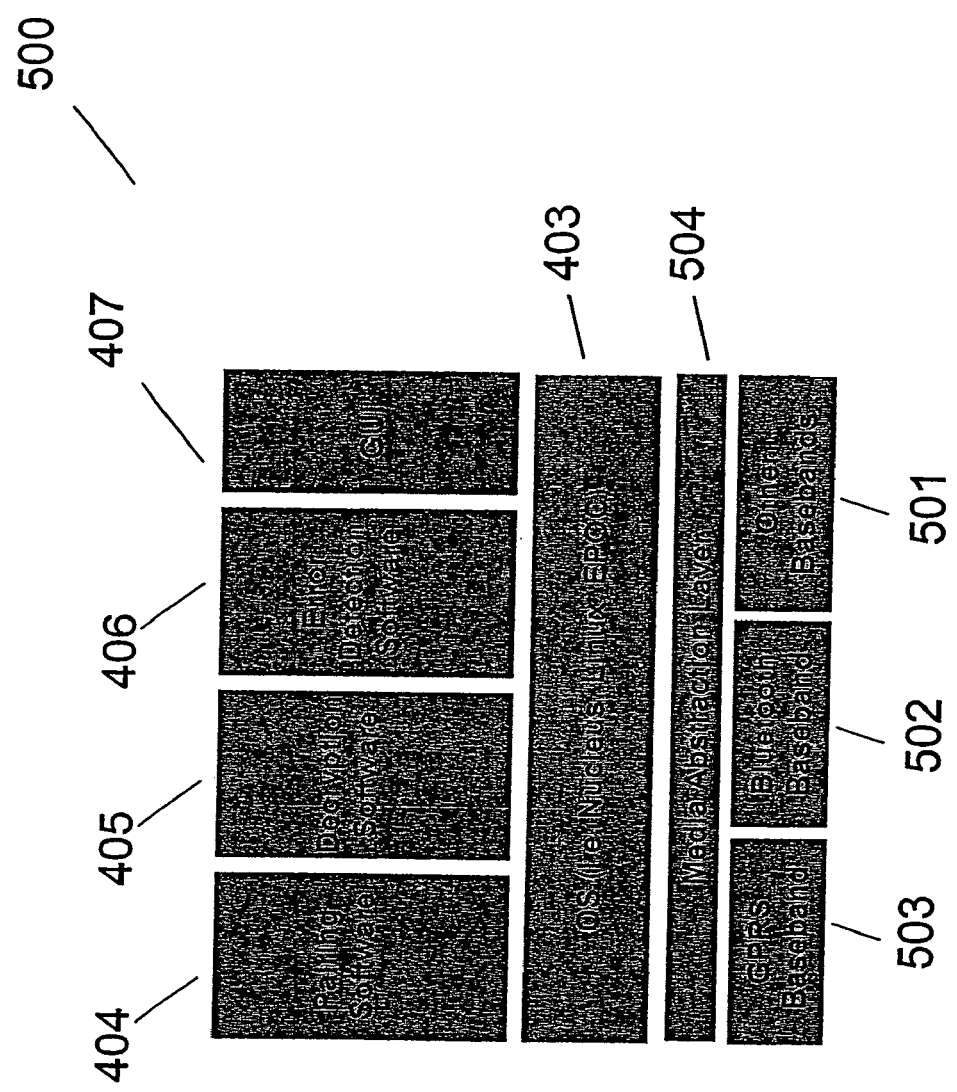
FIG. 4 is a software block diagram architecture for pairing a device in a short distance wireless network according to an embodiment of the present invention.
Figure 7:
FIG. 7 illustrates a web site, and in particular a web page, for a user inputting pairing information according to an embodiment of the present invention.

In an embodiment of the present invention, a web page 700, as illustrated by FIG. 7, is located at server 101 for entering personal identification numbers ("PINs") associated with recently obtained terminals 107. A user of a terminal in short distance wireless network 116, a manufacturer, a reseller or a telecommunication provider may enter a PIN number associated with a terminal in order to add the terminal to short distance wireless network 116. After a PIN and potentially other identification information, such as a device identification number, are entered at web page 700, server 101 generates a pairing message transferred over WAN 105 to device 106. In an embodiment of the present invention, the pairing message is an Internet/Protocol ("IP") message. In an embodiment of the present invention, the pairing message is a SMS message. In an embodiment of the present invention, the pairing message is a message sent via the WAN, such as the control channel of the wireless network. In an alternate embodiment of the present invention, the pairing message is encrypted to prevent fraud or illegal pairing. Decryption software component 405 then decrypts the pairing message, as illustrated in FIG. 4. In an alternate embodiment, decryption software component 405 authenticates the pairing message by validating a digital signature in the paring message. The PIN in the paring message is then stored in device 106 memory. In an alternate embodiment, other information in the pairing message is stored in device 106 memory. In an embodiment of the present invention, a terminal in terminals 107 periodically requests pairing, or request pairing after a user request, by generating a Bluetooth™ message including a PIN to device 106. Device 106 then compares the stored PIN obtained in the pairing message with the PIN obtained from Bluetooth™ message from a terminal in short distance wireless network 116. In an embodiment of the present invention, if the two PINs match, a Bluetooth™ communication channel is established between device 106 and the terminal generating the Bluetooth™ message having a PIN. In an embodiment of the present invention, if a terminal in terminals 107 is not available to device 106 when requested, device 106 waits until the terminal in terminals 107 is available to request pairing without requiring a new PIN number to be entered.

In an alternate embodiment of the present invention, server 101 does not push a pairing message to 106. Once device 106 receives a pairing request from a terminal in terminals 107, device 106 sends a message to server 101 to confirm the paring. Server 101 searches PIN database 101b to determine if the requesting terminal having a PIN matches a PIN in PIN database 101b. If a match is found, server 101 generates a pairing message to device 106 approving the paring. A communication channel is then established between device 106 and the requesting terminal. If the PIN sent by the terminal in terminals 107 does not match the PIN in server 101 database, server 101 generates a pairing message to device 106 that paring is denied and communication between device 106 and the requesting terminal does not occur.

In still another embodiment, server 101 sends a remove or depairing message to device 106. In response to the remove message, device 106 ceases a communication channel with a terminal identified in the remove message.

In still a further embodiment of the present invention, a user enters a PIN, corresponding to a PIN assigned to device 106, into a terminal of terminals 107. The terminal then generates a Bluetooth™ message including the PIN of device 106 to device 106 requesting paring. Device 106 then compares the PIN in the Bluetooth message with an internal PIN stored in memory. If the PINs match, a communication channel is formed between device 106 and the terminal; otherwise, pairing and communication to device 106 is denied. In this embodiment, a user simply enters a PIN and paring is done automatically when the terminal enters the radio range of device 106. The terminal periodically generates a request to pair Bluetooth™ message including the PIN. Thus, the user does not have to go through a "discover" and select mode in order to form a short distance wireless network.

In still another embodiment of the present invention, a terminal in short distance wireless network 116 includes an error detection software component 406 responsible for verifying whether a user has entered a valid PIN. If the user does not enter a valid PIN, error detection software component 406 indicates an invalid entered PIN to a user. For example, the terminal may display "Incorrect PIN" on a display as illustrated in FIG. 5c. In an alternate embodiment, error detection software component 406 includes an error correction software component for correcting an erroneously entered PIN as described below.

For example, a user purchases PDA 107b having Bluetooth™ capabilities at a retailer and would like to add PDA 107b to short distance wireless network 116. A salesman would access a web page 700 located at server 101. In an embodiment of the present invention, the web page 700 is owned and operated by a telecommunication operator providing cellular signals 111 to cellular telephone 106. The salesman would enter a user name, the name of PDA 107b (device identification number), the manufacturer of PDA 107b (device manufacturer), the model or capabilities of PDA 107b (device model), and a PIN or personal identification symbol. In a preferred embodiment of the present invention, only a PIN and device identification number is entered. In an embodiment of the present invention, the telecommunication provider has given the user a PIN for forming a short distance wireless network 116. Server 101 then generates an encrypted pairing message in response to the salesman's input. The pairing message is transferred over WAN 105 to cellular telephone 106 having Bluetooth™ capabilities in order to allow paring of telephone 106 and a requesting terminal. In an alternate embodiment of the present invention, a user, a manufacturer, a telecommunication provider or a reseller transfers the PDA 107b information using a telephone, by way of keypad entries or voice, to server 101 that generates a pairing message.

In still another embodiment of the present invention, a user, a manufacturer, a telecommunication provider or a reseller uses a SMS for generating a pairing message.

In a preferred embodiment of the present invention, a telecommunication provider or reseller manually enters a PIN into a terminal during the purchase of terminal, such as PDA 107b. Error detection software 406 verifies the validity of the entered PIN and notifies the user or reseller of a successful pairing. Even though the new PDA 107b is not within range of a user's short distance wireless network 116, the user and reseller do not have to be concerned with the actual paring. The pairing will be accomplished using typical Bluetooth™ protocol once PDA 107b is within range of the user's short distance wireless network 116. Once PDA 107b is within range of short distance wireless network 116, PDA 107b can provide information, such as device identification, device manufacturer and so on, to server 101, by way of device 106, in order for server 101 to generate a confirmation or denial paring message to device 106 based on a query and comparison of information in PIN database 101b.

Thus, a user is able to easily and efficiently add a device to a short distance wireless network with little or no intervention by allowing a third party to pair or add the device. Moreover, a telecommunication provider has more information and control over devices having access to their telecommunication networks. Manufactures may also have more information as to how their devices are being used. This will enable manufacturers to design and produce devices that will more effectively meet the preferences of their consumers.

II. Hand-Held Device/Terminal Hardware

Figure 2:
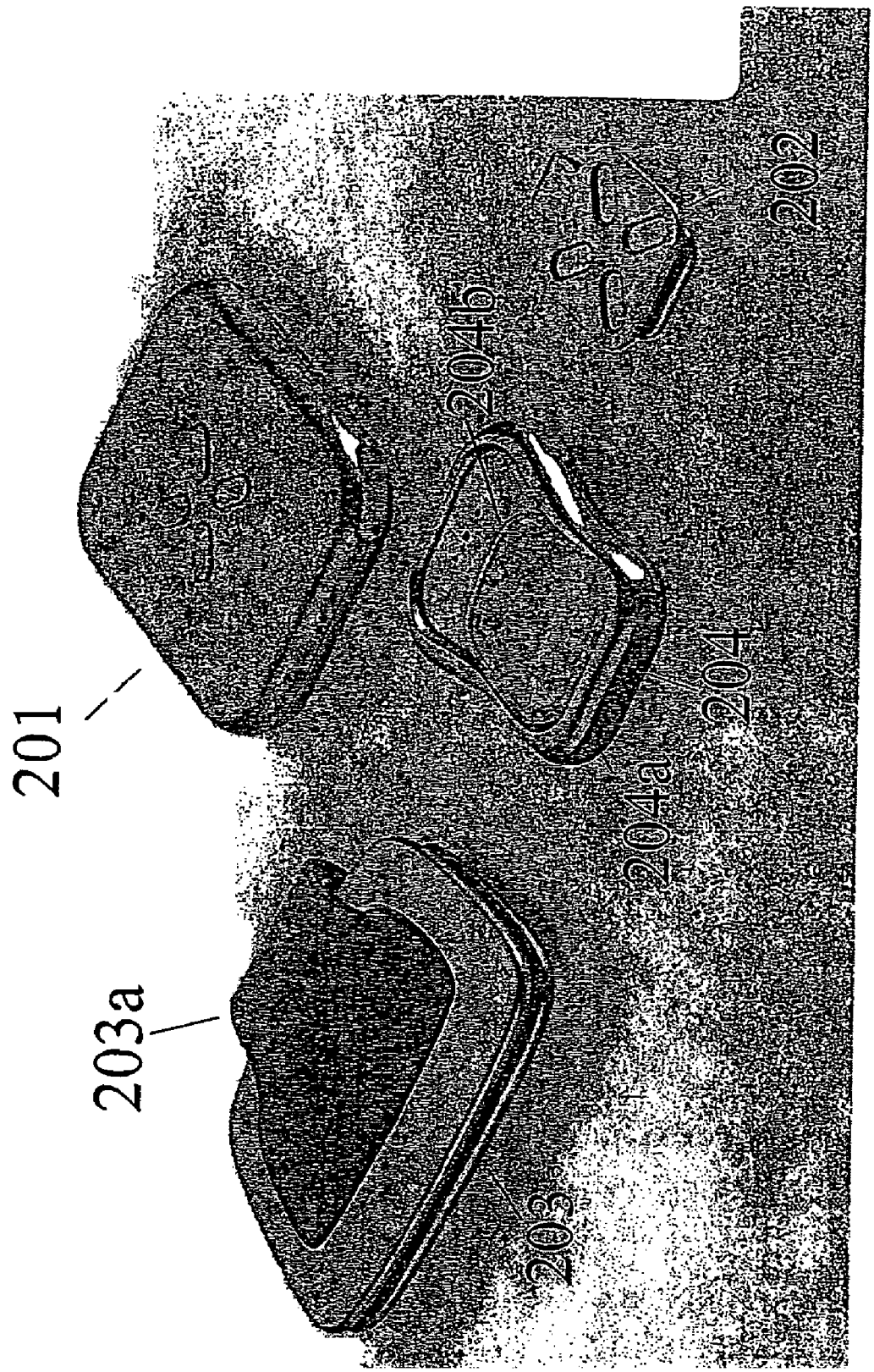
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3*a* illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350 illustrated in FIG. 3*b*.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3*b* illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107*d*, a disk drive and other input/output components are present.

III. Software

FIG. 4 illustrates a software architecture 500 for device 106 illustrated in FIG. 3*a* according to an embodiment of the present invention. Software 500 is stored in program memory, such as FLASH memory 302. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), FLASH, ROM (Read-Only Memory), or other readable or writeable data storage technologies, singly or in combination. In yet another embodiment, software 500, or components thereof, is downloaded from server 102 illustrated in FIG. 1.

Software 500 includes telecommunication software or physical layer protocol stacks, in particular cellular communications software 503 and short-range radio communications software 502. In an embodiment, communication software 503 is a GPRS baseband software component used with processor 306 to transmit and receive cellular signals. In an embodiment, communication software 502 is a Bluetooth™ baseband software component used with processor 307 to transmit and receive short-range radio signals. Other telecommunication software may be used as illustrated by other basebands 501.

In an embodiment of the present invention, operating system ("OS") 403 is used to communicate with telecommunications software 502 and 503. In an embodiment of the present invention, operating system 403 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 403 manages hardware and enables execution space for device software components.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Pairing software component 404, decryption software component 405 and error detection software component 406 are used to add a terminal/device to a short distance wireless network according to an embodiment of the present invention. In an alternate embodiment of the present invention, software components 404, 405 and 406 are combined and/or partitioned into more software components.

In an embodiment of the present invention, pairing software component 404 pairs or adds a terminal or device to short distance wireless network 116 in response to a pairing message. In an embodiment of the present invention, pairing software component 404 and decryption software component 405 are executed on the hardware components of device 106 in order to generate and receive short-range radio signals for establishing a communication channel with a newly added terminal in short distance wireless network 116. In an embodiment of the present invention, pairing software component 404, decryption software component 405, operating system 403 and Bluetooth™ Baseband software component 502 are used to generate and receive short-range radio signals 110 for establishing a communication channel.

Error detection software component 406 is used to determine whether an identification symbol or PIN is valid and notify a user of such. In an embodiment of the present invention, error detection software component 406 is stored in a terminal, such as headset 107*c*, of terminals 107 which is attempting to pair with device 106. In an embodiment of the present invention, all PIN numbers are required to have individual digits sum to a predetermined number or checksum digit. So if a user incorrectly types a PIN number, error detection software component 406 will add the digits and compare the sum to the predetermined checksum digit, and then notify the user that an invalid PIN has been input. For example, a checksum digit may be the last digit of a PIN code, such as the digit 9. If a user enters an incorrect PIN number, "70219" as illustrated in FIG. 5a. FIGS. 5a-b-c illustrates user input/output for adding a terminal/device to short distance wireless network 116 shown in FIG. 1. In an embodiment of the present invention, device 106 is a cellular telephone having a display 515 and keypad 516. Error detection software component 406 would add 7, 0, 2 and 1 for a total of 10. The added digits summing 10 would be compared to the predetermined checksum digit of 9. Because the summed digits, 10, does not equal the checksum digit of 9, the user would be notified of an "Incorrect PIN" as shown in FIG. 5c. If a valid PIN was entered, a valid notification may be generated after pairing, such as "Headset Paired" as illustrated in FIG. 5b.

In an alternate embodiment of the present invention, error detection software component 406 includes an error correcting software component for correcting an erroneously entered PIN. For example, a reed-solomon code may be used.

In alternate embodiments of the present invention, other PIN error detection methods or software components are used to detect inputting an incorrect PIN.

Furthermore, Graphics User Interface ("GUI") 407 is provided to allow a user-friendly interface.

Figure 6A:
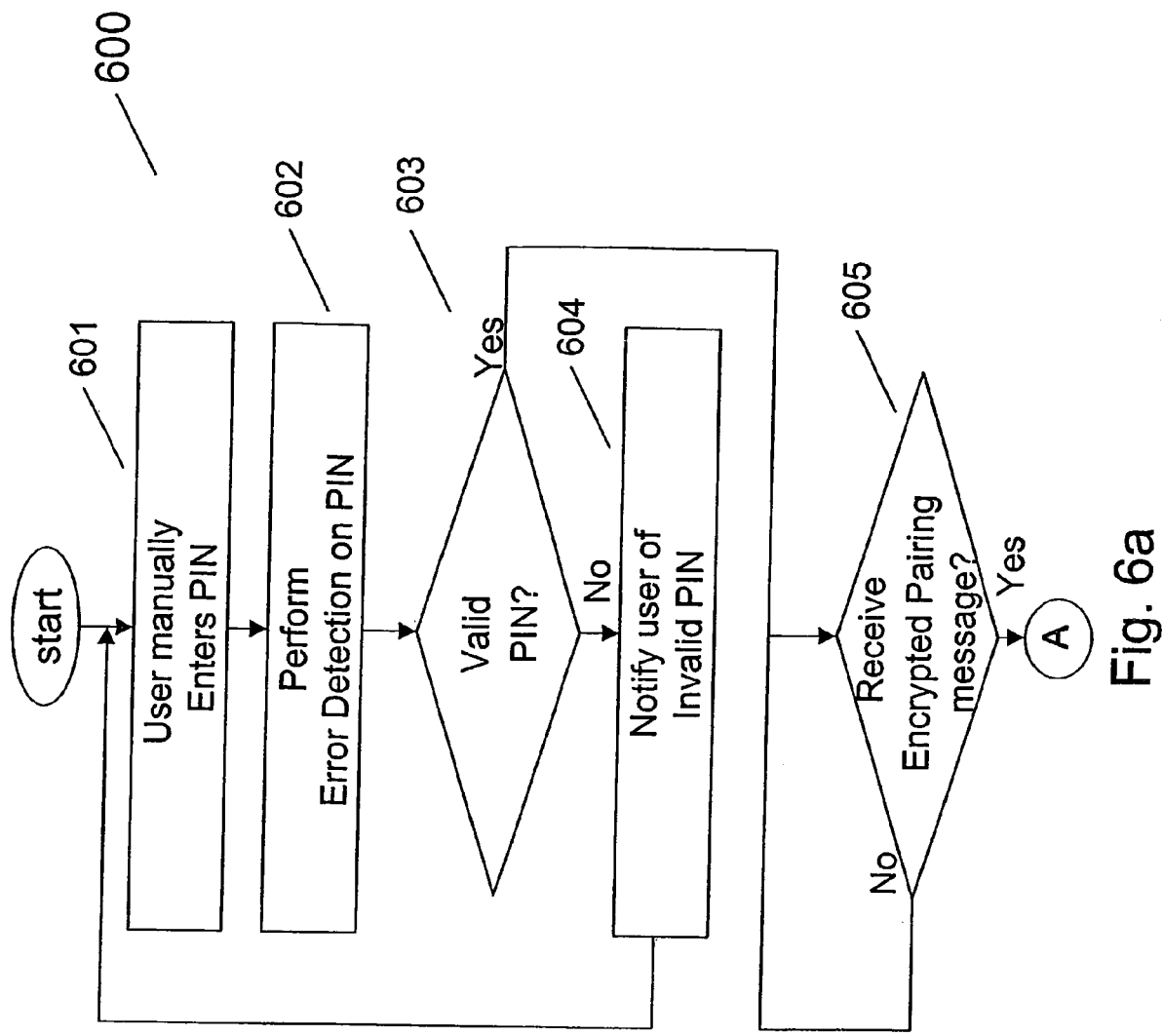
FIGS. 6a-b are flowcharts illustrating pairing devices in a short distance wireless network according to an embodiment of the present invention.
Figure 6B:
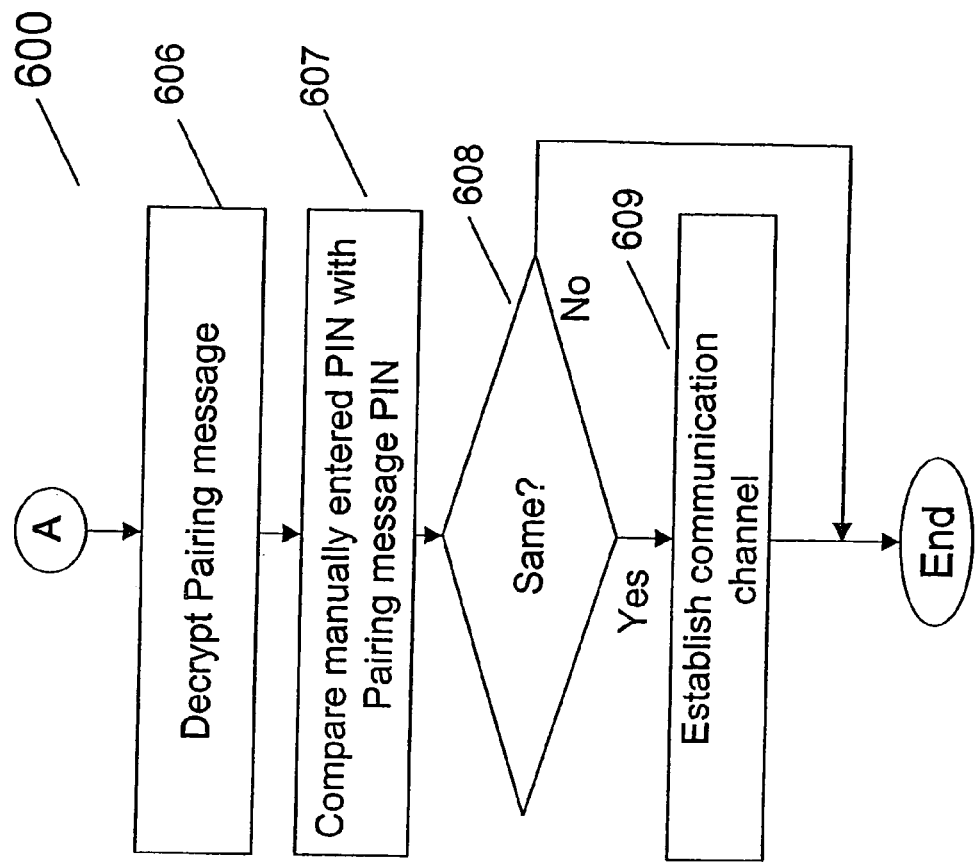

FIGS. 6a-b illustrate a method 600 for pairing devices in a short distance wireless network 116 according to an embodiment of the present invention. In an embodiment, method 600 is performed by pairing software component 404, decryption software component 405 and error detection software component 406 illustrated in FIG. 4. In an embodiment of the present invention, a logic box or step illustrated in FIGS. 6a-b may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or step are carried out in method 600.

As illustrated in FIG. 6a, a user manually enters a PIN at a terminal to be paired with device 106 in short distance wireless network 116, as illustrated by block 601. A determination is made whether the PIN is valid as illustrated by block 602 and 603. In an embodiment of the present invention, error detection software component 406 is used to determine whether the PIN is valid. In an embodiment of the present invention, error correction software corrects an incorrectly entered PIN. If the PIN is not valid, control passes to block 604 were a user is notified of a invalid PIN.

In an embodiment of the present invention, server 101 in response to user input generates a pairing message. In an alternate embodiment of the present invention, the pairing message is generated by a SMS. In an embodiment of the present invention, the pairing message is encrypted to prevent fraud and illegal registration.

Device 106 determines whether the pairing message is received as illustrated by logic block 605.

If a pairing message is received, the pairing message is decrypted by decryption software component 405 as illustrated by logic block 606 in FIG. 6b.

In an embodiment of the present invention, a PIN in the pairing message is compared with the PIN received from a Bluetooth™ message from the terminal in terminals 107 attempting to pair with device 106 as illustrated by logic block 608. If the PIN received from the pairing message is the same as the PIN received from the terminal, a communication channel is established as illustrated by logic block 609. Otherwise, a communication channel is not established.

In an alternate embodiment of the present invention, a pairing message includes a remove message for canceling a communication channel between two devices.

Likewise in an alternate embodiment of the present invention, device 106 forwards the PIN received from the terminal to server 101. A confirmation pairing message is generated by pairing message generation software component 101a if the PIN matches a respective PIN in PIN database 101b. Thus, a communication channel between device 106 and a terminal is established upon a successful match.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system for forming a short distance wireless network, the system comprising:

a logic unit in a first device to generate a plurality of short-range radio signals, such that a first short-range radio signal in the plurality of short-range radio signals comprises a request to establish communication in the short distance wireless network and a first identification symbol;

wherein a second device receives the first short-range radio signal, when the second device enters a short-range radio range of the first device;

wherein the second device receives a plurality of cellular signals from a wide area network, a first cellular signal in the plurality of cellular signals including a second identification symbol;

wherein the second device establishes wireless communication with the first device, when the first identification symbol included in the first short range radio signal matches the second identification symbol included in the first cellular signal; and a logic unit in the first device to indicate when a third identification symbol entered into the first device by a user is erroneous and to correct the third identification symbol to the first identification symbol.

2. The system of claim 1, wherein the first device generates the plurality of short-range radio signals periodically after a user enters the first identification symbol into the first device.

3. The system of claim 1, wherein the first device comprises a logic unit to indicate when the first identification symbol is valid.

4. The system of claim 1, wherein the first device includes a logic unit to indicate on a display of the first device that wireless communication between the first device and second device is established.

5. The system of claim 1, wherein the first device includes a logic unit to correct the third identification symbol to the first identification symbol.

6. The system of claim 1, wherein the second device comprises a logic unit to receive a first cellular signal, in the plurality of cellular signals, including the second identification symbol from the wide area network, wherein the wide area network is included in the Internet.

7. The system of claim 6, wherein the second identification symbol is encrypted and the second device decrypts the encrypted second identification symbol.

8. The system of claim 6, wherein the first cellular signal includes a digital signature and the second device authenticates the second identification symbol by validating the digital signature.

9. The system of claim 1, wherein the second device comprises a logic unit to receive a message in the form of a first cellular signal, in the plurality of cellular signals, that indicates wireless communication between the first device and the second device are prevented.

10. A method for adding a first device to a short distance wireless network having a second device, the method comprising:
receiving a first identification symbol by a first device;
wherein the second device obtains a second identification symbol, by way of a cellular signal;
wherein the second identification symbol is stored in the second device;
transmitting a short-range radio signal including the first identification symbol from the first device to the second device;
wherein second device compares the first identification symbol with the second identification symbol;
wherein the second devices forms a short-range radio communication channel with the first device when the first identification symbol matches the second identification symbol;
indicating when a third identification symbol entered by the user is invalid;
correcting the third identification symbol to the first identification symbol; and
wherein the first identification symbol is entered into the first device by a user.

11. The method of claim 10, further comprising:
notifying a user of forming the short-range communication channel between the first device and the second device.

12. The method of claim 10, wherein the short-range radio signal is transmitted periodically after a user enters the first identification symbol into the first device; and
wherein the short-range radio communication channel between the first device and the second device is formed when the second device enters the short-range radio signal range of the first device.

13. The method of claim 10, wherein the second device decrypts the second identification symbol that has been encrypted.

14. The method of claim 10, wherein the second device receives a cancellation message in the form of at least the cellular signal, the message indicates canceling the short-range radio communication channel between the first device and the second device; and
wherein the short-range radio communication channel between the first device and the second device is cancelled in response to receiving the cancellation message.

15. A computer readable medium comprising logic code, wherein execution of the logic code by a processor causes a system to:
receive a short-range radio signal in a short distance wireless network;
receive a cellular signal in a wide area network; and
add a device to the short distance wireless network when a first identification symbol received in the form of the short-range radio signal matches a second identification symbol received in the form of the cellular signal;
determine whether a third identification symbol entered into the first device by a user is erroneous; and
correct the third identification symbol to the first identification symbol in response to determining that the third identification symbol is erroneous.

16. The computer readable medium of claim 15, further comprising logic code, wherein execution of the logic code by a processor further causes the system to notify a user on a display that the device is added to the short distance wireless network.

17. The computer readable medium of claim 15, further comprising logic code, wherein execution of the logic code by a processor further causes the system to decrypt the first identification symbol.

* * * * *